United States Patent [19]

Friedrich

[11] Patent Number: 5,223,189
[45] Date of Patent: Jun. 29, 1993

[54] METHOD OF SEALING LATERAL CONNECTIONS FOR PIPE LINERS

[75] Inventor: Struve Friedrich, Kingwood, Tex.

[73] Assignee: Gundle Lining Systems, Inc., Houston, Tex.

[21] Appl. No.: 817,731

[22] Filed: Jan. 7, 1992

[51] Int. Cl.⁵ .................... B29C 63/34; B29C 65/34
[52] U.S. Cl. ...................... 264/31; 156/293; 156/304.2; 156/94; 264/36; 264/248; 264/269; 264/314; 264/DIG. 46; 264/265; 264/229; 219/213; 219/535; 219/547; 425/DIG. 13
[58] Field of Search ............... 138/97, 98; 156/304.2, 156/293, 83, 94; 264/36, 269, 314, 516, DIG. 46, 31, 248, 265, 229; 219/59.1, 67, 10.57, 201, 547, 544, 549, 557, 528, 535, 213

[56] References Cited

U.S. PATENT DOCUMENTS

| | | | |
|---|---|---|---|
| 4,197,908 | 4/1980 | Davis et al. | 166/55 |
| 4,394,202 | 7/1983 | Thomas et al. | 156/94 |
| 4,421,582 | 12/1983 | Horsma et al. | 156/86 |
| 4,642,155 | 2/1987 | Ramsey | 156/304.2 |
| 4,670,078 | 6/1987 | Thalmann et al. | 156/304.2 |
| 4,675,512 | 6/1987 | Doucet et al. | 219/535 |
| 4,724,108 | 2/1988 | Jurgenlohmann et al. | 264/269 |
| 4,738,742 | 4/1988 | Shishkin et al. | 156/391 |
| 4,752,511 | 6/1988 | Driver | 428/36 |
| 4,781,780 | 11/1988 | Hannover | 156/287 |
| 4,861,634 | 8/1989 | Renaud | 428/36.1 |
| 4,863,365 | 9/1989 | Ledoux et al. | 425/343 |
| 4,866,252 | 9/1989 | Van Loo et al. | 219/535 |
| 4,867,921 | 9/1989 | Steketee, Jr. | 264/36 |
| 4,969,972 | 11/1990 | Kunz | 156/304.2 |
| 4,985,196 | 1/1991 | Ledoux et al. | 264/516 |
| 4,986,951 | 1/1991 | Ledoux et al. | 264/516 |
| 4,998,871 | 3/1991 | Ledoux | 425/140 |
| 5,010,440 | 4/1991 | Endo | 364/215 |

FOREIGN PATENT DOCUMENTS

| | | | |
|---|---|---|---|
| 2440086 | 11/1977 | Fed. Rep. of Germany. | |
| 2-158323 | 6/1990 | Japan | 138/97 |
| WO85/03758 | 8/1985 | PCT Int'l Appl. | 138/97 |
| 2041147 | 9/1980 | United Kingdom | 138/97 |
| 2096265 | 10/1982 | United Kingdom | 138/97 |

OTHER PUBLICATIONS

German Brochure: "Das Original: Friedrichsfelder Sicherheits-fittings Frialen®".

Primary Examiner—Jeffery Thurlow
Assistant Examiner—Mathieu Vargot
Attorney, Agent, or Firm—Arnold, White & Durkee

[57] ABSTRACT

The invention provides an apparatus and method by which an opening into a lateral pipe connection for a pipeline into which a liner is being installed may be sealed and protectively lined. The invention features a bushing which is emplaced in the lateral connection by use of an expandable mandrel and a control means. The bushing includes an integral heating element for softening the thermoplastic material from which the bushing is formed. O-rings are positioned between the bushing and the lateral pipe to form a seal.

6 Claims, 1 Drawing Sheet

METHOD OF SEALING LATERAL CONNECTIONS FOR PIPE LINERS

BACKGROUND OF THE INVENTION

1. Field of the Invention

The present invention generally relates to a method and apparatus for lining pipe. In particular, the invention relates to lateral connections that are used to compliment relining of an existing sewer line or similar conduit.

2. Description of the Prior Art

Liners for pipe, such as that used in sewer pipelines, are often applied as the pipe ages to extend the life of the original fixture. Means for lining pipe are well known in the art. One such method is disclosed by LeDoux et al. in U.S. Pat. No. 4,985,196. This method employs a thermoplastic liner which is initially formed in a cylindrical shape with a diameter slightly larger than the internal diameter of the pipe. The liner is temporarily deformed at an elevated temperature to a reduced cross section, preferably U-shaped, to reduce its overall cross-sectional dimension and facilitate insertion into the pipe to be lined. After insertion, the liner is re-heated and pressurized so that shape memory characteristics of the thermoplastic material cause the liner to return to its original cylindrical shape. The liner is further adapted to conform to the interior surface of the pipe by means of increasing pressure within the liner in two stages. Additionally, an expansion pig may be employed to ensure even more exact conformance.

Other methods, which also employ liners, are discussed in U.S. Pat. No. 4,867,921 by Steketee, Jr. and U.S. Pat. No. 4,861,634 by Renaud. The Steketee, Jr. patent suggests that such a liner may be restored to a cylindrical shape by plugging the ends of the liner and pressurizing the liner with an expanding material such as live steam or hot water. It also teaches the use of an apparatus comprising a mandrel having a heating means therein which may be drawn through the liner to expand the liner to the desired diameter.

Still another recommended method, disclosed in the Steketee, Jr. patent, involves flushing hot water or steam down the original pipeline alongside the folded liner until the desired temperature is achieved at the downstream end. Once the desired temperature is reached, the liner is pressurized with hot water and expanded under pressure to fit.

The Renaud patent discloses a method of lining ducts wherein a sleeve permeable over at least a part of its thickness to a heat hardenable resin, such as an epoxy resin, is introduced into the duct. The sleeve is able to enlarge its section under the action of a pressure exerted on its internal wall and able to adapt its section to that of the duct without the composite material for such sleeve undergoing an elastic or plastic deformation. The internal pressure is exerted via an inflatable balloon until the external wall of the sleeve is applied against the internal wall of the duct, and it is held in place until the resin hardens, at which time the balloon is deflated and removed. The surface of the balloon for this apparatus may include a heating element or elements in the form of metal wires or strips to aid in curing the resin. Heating is provided by electric means.

Unfortunately, current pipe lining methods are not a complete solution to the problems posed by a deteriorating pipeline. When sewer lines and similar conduits are relined, the newly emplaced liner will normally cover lateral entrances for smaller pipes which feed into the freshly lined pipe. As a result, holes must be cut in the liner to reexpose these entrances. Holes cut into the liner, however, will permit waste and effluent to enter the space created between the new liner and old pipeline at the point where the lateral line feeds in. The possible results from this entry include separation of the liner from the pipeline, escape of effluents and further decay of the original pipeline. This could, in turn, leave spaces between the liner and the surface of the original pipeline which would promote decay and freeze-thaw failures for the liner.

Limited efforts toward solving this problem have been made. KWS·VSH leidingrenovatie v.o.f. has recently developed a method for emplacing a thermoplastic protective lining at a laterally intersecting pipeline junction. The method involves cutting a hole in the liner of a relined main pipeline to expose a lateral opening and placing an annular thermoplastic lining which has a mastic on the outside diameter within the opening. The annular lining is then expanded and sealed to the liner of the main pipeline by heating and expanding the lining thereby squeezing the mastic to form a seal with the aid of an axially placed expandable heated mandrel.

SUMMARY OF THE INVENTION

The invention provides an apparatus and method by which a lateral pipe connection may be sealed when existing sewer pipelines are relined to give them added life.

The invention features a bushing which may be installed within a lateral sewer pipeline at the intersection of a relined main pipeline and an incoming lateral line. The bushing is slightly smaller than the inside diameter of the lateral pipeline to permit insertion into the lateral line. The bushing is heated and is then made to conform against the interior walls of the lateral line with an expandable mandrel and control means. The bushing is preferably comprised of a thermoplastic material having an integral heating system and employs a number of O-rings to seal against the sides of the lateral connection. The O-rings are preferably made of an elastomeric material and may reside in grooves around the exterior of the bushing. When the bushing is conformed against the walls of the lateral line, the rings will provide for greater sealing.

Preferably, the integral heating system comprises two differentially controlled heating assemblies comprised of a number of electrically conductive heating elements. One heating assembly is disposed throughout the bushing and can be energized to heat the bushing to malleability and allow it to be conformed to the walls of the lateral pipeline. Another heating assembly is disposed in the surface of the bushing adjacent the lining and can be energized to effect a seal between the bushing and the thermoplastic liner.

If emplacement of the bushing occurs after the main sewer line has been relined, the bushing secures the loose edges of liner created by the cut holes and permits the interior surface of the liner to be made continuous with the interior surface of the bushing.

BRIEF DESCRIPTION OF THE DRAWINGS

Further details are explained below with the help of the examples illustrated in the attached drawings in which.

DETAILED DESCRIPTION OF THE PREFERRED EMBODIMENTS

Figure 1:
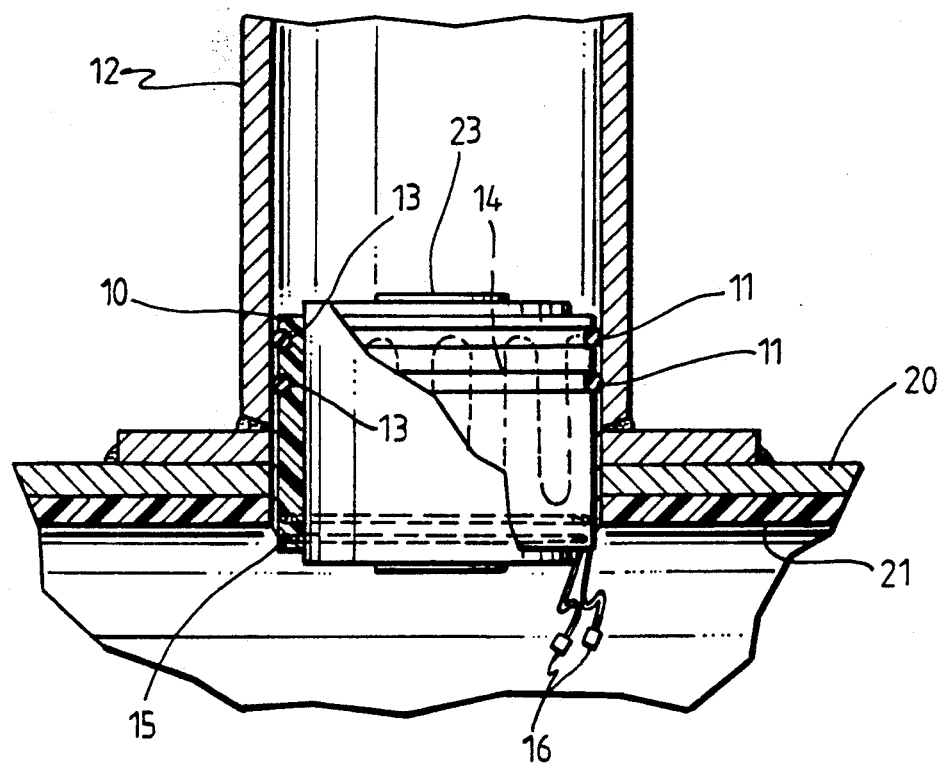
FIG. 1 is a cross-sectional view of the bushing of the present invention disposed within an intersecting lateral pipe.

A preferred embodiment of the present invention is depicted in FIG. 1. In accordance with the present invention, bushing 10 is illustrated in its initial position within lateral pipeline 12. Bushing 10 is preferably constructed of thermoplastic material which would be expected to conform to the walls of the lateral pipeline, upon application of pressure and increased temperature to the material. The outside diameter of bushing 10 is slightly smaller than the interior diameter of the lateral pipeline to permit ease of entry into the lateral line.

Bushing 10 further comprises one or more O-rings 11 which surround the upper portion of bushing 10 and are designed to contact and friction seal against the inner wall of the lateral pipeline 12. Preferably, bushing 10 would have a plurality of these annular rings to provide for greater sealing. The annular rings 11 are preferably constructed of rubber, neoprene, or a similar elastomeric material with durability and good sealing qualities against liquids. Rings 11 may reside in annular channels 13 along the exterior circumference of bushing 10 to prevent axial movement along the exterior of the bushing.

The height of bushing 10 depends upon the diameter of the main pipe and the height of the control means 18 which is used to position the bushing in the lateral connection. In one embodiment, bushing 10 would have a height of about 5 inches when main pipe 20 has an internal diameter of about 10 inches.

Bushing 10 includes an integral heating system. In a preferred embodiment, the heating system comprises differentially controllable heating assemblies. Upper heating assembly 14 is fixedly disposed throughout the walls of bushing 10. Upper heating assembly 14 may be comprised of at least one internally disposed heating element such as electrically resistive metal wire, metal strips, or mesh or at least one superficially disposed heating element such as a heating tape or pad. The upper heating assembly should provide sufficient heat to bushing 10 to permit the bushing to become malleable so that it may be conformed to the walls of the lateral pipeline. Upper heating assembly 14 may be configured to provide heating to the entire wall of housing 10 or selected portions.

Bushing 10 also includes a lower heating assembly 15. Lower heating assembly 15 may also be comprised of at least one internally or superficially disposed heating element such as the type described above. Lower heating assembly 15 is preferably annular in configuration and disposed proximate the outer surface of the bushing. The lower heating assembly should provide sufficient heat to the bottom portion of bushing 10 to cause the thermoplastic material of the bushing to fuse with the thermoplastic material of the liner.

Bushing 10 is interconnectable with means for energizing heating elements 14 and 15. Connecting means 16 comprises at least one socket or other device which will permit interconnection with a power source such as an electric generator.

Figure 2:
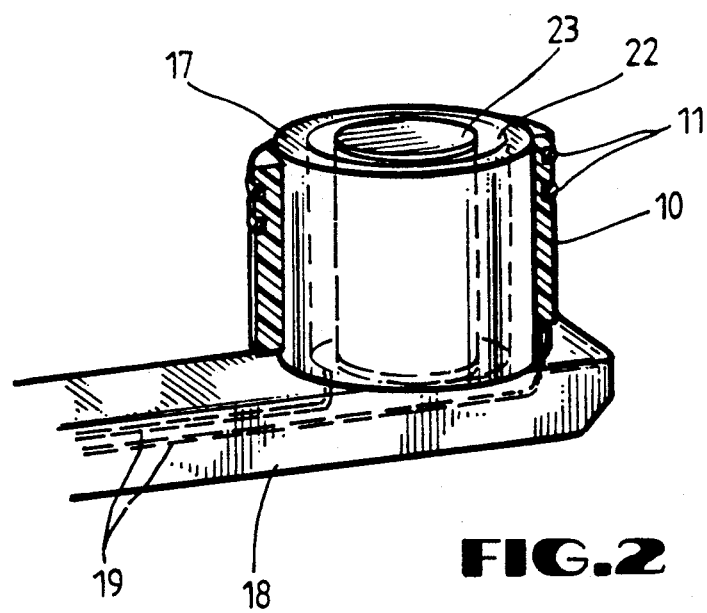
FIG. 2 depicts a preferred embodiment for the bushing of the present invention axially seated upon an expandable mandrel which is interconnected with a control means.

Referring now to FIG. 2, prior to emplacement, bushing 10 is axially seated upon an expandable mandrel 17 which is interconnected with control means 18. Control means 18 may comprise a robot similar to those devices which move through a sewer line following a relining operation to cut lateral openings in the newly emplaced liner. Such a device is disclosed in U.S. Pat. No. 4,197,908.

Control means 18 provides support for expandable mandrel 17 as well as means for operating the expansion and contraction of said mandrel. Preferably, control means 18 contains power transmission means 19 which is interconnectable with connecting means 16 as well as easily disconnectable therewith. In one embodiment, connecting means 16 is preconnected with power transmission means 19 by "breakaway" connections in which the connecting means is readily disengaged from the power transmission means upon withdrawal of the power transmission means and control means following emplacement of the bushing into the lateral line. A plug and socket arrangement is one example of a suitable embodiment for such a connection. Another suitable arrangement employs thin wires which would themselves be broken upon withdrawal of the control means. Power transmission means 19 preferably comprises an electrical conduit for carrying electrical current from a nearby generator or other power source. Alternatively, power transmission means 19 may comprise a battery or series of batteries housed within control means 18.

Radial expansion and contraction of mandrel 17 may be accomplished a number of ways. Expandable mandrel 17 is preferably constructed of a durable material which is able to withstand repeated heating and cooling by heating assemblies 14 and 15. A suitable expandable mandrel would comprise an inflatable bladder 22 constructed of a material such as heat resistant canvas and inflated by gas or fluid and which radially surrounds a solid core 23. Mechanical mandrels could also be used.

Referring now to the method or process by which a lateral pipe connection may be sealed and protectively lined, the steps thereof are substantially as follows. Bushing 10 is axially seated upon expandable mandrel 17. Connecting means 16 is interconnected with power transmission means 19. Control means 18 is used to place bushing 10 and expandable mandrel 17 within lateral pipe 12 proximate the intersection of lateral pipe 12 with the main pipe 20. It is highly preferred that the bottom edge of bushing 10 be made flush with or extend beyond the inside diametrical surface of emplaced pipe liner 21.

Upper heating assembly 14 is energized to make the thermoplastic material of bushing 10 malleable. Expandable mandrel 17 is then radially expanded to cause bushing 10 to substantially conform to the surface of lateral pipe 12. O-rings 11 provide a sealed closure between bushing 10 and the surface of lateral pipe 12.

Once sealed closure has been achieved between bushing 10 and the surface of lateral pipe 12, lower heating assembly 15 may be energized. The lower heating assembly imparts a greater temperature to the surrounding sections of bushing 10 than does upper heating assembly 14. Further, lower heating assembly 15 will also heat the surrounding portions of liner 21. Heating of the lower portion of bushing 10 should occur until a portion of the thermoplastic material approaches its liquid limit and creates a seal with the adjoining liner 21. The thermoplastic material comprising the bottom portion of bushing 10 will ideally fuse or meld with the thermoplastic material comprising liner 21 to form a relatively continuous surface over the interiors of liner 21 and bushing 10.

Once the above seals have been established, the upper and lower heating assemblies should be deenergized and bushing 10 allowed to cool. Power transmission means 19 may be disconnected from connecting means 16. After bushing 10 has cooled sufficiently to maintain its shape and seals, expandable mandrel 17 may be contracted and withdrawn by control means 18.

While the preferred forms and applications of the invention are herein described, it is noted that the invention is not limited or restricted to the specific details herein set forth. The inventor reserves to himself any modifications or variations that may appear to those skilled in the art as set forth within the spirit and scope of the claims. For example, in practicing the method of the invention, the heating assemblies may be energized prior to emplacement of the bushing proximate the intersection of lateral pipe 12 and main pipeline 20.

I claim:

1. A method for sealing and protectively lining openings into lateral connections for pipelines into which a liner is being installed, said method comprising the steps of:
    a) axially seating a bushing having an integral heating system upon an expandable mandrel;
    b) placing the bushing and expandable mandrel within an intersecting lateral pipe proximate the intersection of said lateral pipe with said pipeline;
    c) energizing said integral heating system until said bushing becomes pliant;
    d) radially expanding said expandable mandrel so that the bushing substantially conforms to the interior surface of the lateral pipe;
    e) deenergizing the heating system;
    f) allowing the bushing to cool until said bushing is able to maintain its expanded shape;
    g) contracting the expandable mandrel so that is can be withdrawn from said bushing; and
    h) withdrawing the expandable mandrel from said bushing.

2. The method of claim 1 including the steps of providing said bushing with a first portion adapted for sealing interaction with said lateral pipe and a second portion, between said first portion and said liner, said second portion including a plastic welding heating system.

3. The method of claim 2 including the step of energizing said plastic welding heating system to effect a seal between said bushing and said liner.

4. The method of claim 3 wherein said bushing is heated to a temperature approaching its thermoplastic liquid limit.

5. The method of claim 1 including the steps of forming a friction seal between said bushing and said lateral pipe and forming a heat sealed connection between said bushing and said liner.

6. The method of claim 1 including the step of heating a portion of said bushing to weld said bushing to said liner.

* * * * *